United States Patent
Yamada

(10) Patent No.: US 12,174,820 B2
(45) Date of Patent: Dec. 24, 2024

(54) DATA MANAGEMENT SYSTEM WITH TAMPER-EVIDENCE

(71) Applicant: Scalar, Inc., Tokyo (JP)

(72) Inventor: Hiroyuki Yamada, Kamakura (JP)

(73) Assignee: Scalar, Inc., Tokyo (JP)

( * ) Notice: Subject to any disclaimer, the term of this patent is extended or adjusted under 35 U.S.C. 154(b) by 644 days.

(21) Appl. No.: 17/424,868

(22) PCT Filed: Aug. 8, 2019

(86) PCT No.: PCT/JP2019/031507
§ 371 (c)(1),
(2) Date: Jul. 21, 2021

(87) PCT Pub. No.: WO2020/152893
PCT Pub. Date: Jul. 30, 2020

(65) Prior Publication Data
US 2022/0092224 A1    Mar. 24, 2022

(30) Foreign Application Priority Data
Jan. 23, 2019 (JP) .................. 2019-009544

(51) Int. Cl.
*G06F 16/23* (2019.01)
*G06F 16/22* (2019.01)
(Continued)

(52) U.S. Cl.
CPC ...... *G06F 16/2365* (2019.01); *G06F 16/2246* (2019.01); *G06F 21/57* (2013.01); *G06F 2221/034* (2013.01)

(58) Field of Classification Search
CPC .. G06F 21/86; G06F 16/2246; G06F 16/2365; G06F 21/57; G06F 2221/034; G06F 21/64
See application file for complete search history.

(56) References Cited

U.S. PATENT DOCUMENTS

2017/0249482 A1 * 8/2017 Takaai ................. H04L 9/3236
2017/0364552 A1 * 12/2017 Pattanaik ............ G06F 16/2365
(Continued)

FOREIGN PATENT DOCUMENTS

EP          3916606 A1 * 12/2021   ......... G06F 16/9024
WO  WO-2019098895 A1 *  5/2019   ........... G06F 21/602

OTHER PUBLICATIONS

K. Rani and C. Sharma, "Tampering Detection of Distributed Databases using Blockchain Technology," 2019 Twelfth International Conference on Contemporary Computing (IC3), Noida, India, 2019, pp. 1-4, doi: 10.1109/IC3.2019.8844938. (Year: 2019).*

(Continued)

*Primary Examiner* — Dennis Truong
(74) *Attorney, Agent, or Firm* — Procopio, Cory, Hargreaves & Savitch LLP

(57) ABSTRACT

A node system of a second computer system executes processing of updating a state of a target specified in a request from a first computer system, and in the executing, adds an object to an asset for the target in an asset set. The object is data that represents the state of the target. The asset is assigned to each target and is a time series of objects. The asset set is a set of assets and has a DAG structure. A node is the object and an edge represents a relationship between objects. The added object is a terminal object. The node system outputs a proof of existence that is the terminal object or a summary thereof, and the proof of existence is saved in an external system managed by a management entity different from a management entity for the node system.

11 Claims, 9 Drawing Sheets

(51) Int. Cl.
    *G06F 21/57*        (2013.01)
    *G06F 21/64*        (2013.01)

(56) References Cited

U.S. PATENT DOCUMENTS

| 2017/0366353 | A1* | 12/2017 | Struttmann | G06F 21/6218 |
| 2018/0329945 | A1* | 11/2018 | Horii | G06F 16/2379 |
| 2019/0199515 | A1* | 6/2019 | Carver | G06Q 20/02 |
| 2020/0052884 | A1* | 2/2020 | Tong | H04L 9/3297 |

OTHER PUBLICATIONS

Nakamoto, S., Bitcoin: A Peer-to-Peer Electronic Cash System, [online] 9 pgs., URL: https://bitcoin.org/bitcoin.pdf.
International Search Report for related PCT App No. PCT/JP2019/031507 dated Nov. 12, 2019, 4 pgs.
Notice of Reasons for Refusal for related JP App No. 2019-543391 dated Sep. 3, 2019, 6 pgs.
Scalar, a "Scalar DLT," prior release, ASCII [online], Oct. 15, 2018, 6 pgs, URL: https://ascii.jp/elem/000/001/757/17570095/.
European Patent Office, Extended European Search Report, Application No. 19912177.3-1218, dated Sep. 15, 2022, in 14 pages.

\* cited by examiner

DATA MANAGEMENT SYSTEM WITH TAMPER-EVIDENCE

CROSS-REFERENCE TO RELATED APPLICATIONS

This application is a U.S. National Stage entry of PCT Application No: PCT/JP2019/031507 filed Aug. 8, 2019, which claims priority to Japanese Patent Application No. 2019-009544 filed Jan. 23, 2019, the contents of which are incorporated herein by reference.

TECHNICAL FIELD

The present invention generally relates to a tamper-evidence technique.

BACKGROUND ART

A system to which a distributed ledger technology is applied is known as an example of a system with tamper-evidence, and blockchains are known as an example of a distributed ledger technology (e.g., NPL 1).

CITATION LIST

Non Patent Literature

[NPL 1] https://bitcoin.org/bitcoin.pdf

SUMMARY OF INVENTION

Technical Problem

For example, public blockchains and private blockchains are known as the blockchains.

In general, unlike public blockchains, private blockchains do not have competition that is made in Proof of Work or Proof of Stake, and allow all records to be erased and recreated relatively easily.

This kind of problem may occur not only in private blockchains but also in general data management systems, which are systems for managing data (e.g., consortium blockchains, or data management systems to which a technology other than blockchains is applied).

Solution to Problem

Provided are one or a plurality of first management units included in one or a plurality of first computer systems, and one or a plurality of second management units included in one or a plurality of node systems in a second computer system that communicates with one or a plurality of first computer systems. The first management unit issues a state update request, in which a target is specified, to the second computer system. The second management unit receives the state update request and executes processing of updating a state of the target specified in the state update request. In that execution, the second management unit adds an object to an asset for the target in an asset set managed by the second management unit. The object is data that represents the state of the target. The asset is assigned to each target. The asset is a time series of objects. The asset set is a set of assets. The asset set has a DAG (Directed Acyclic Graph) structure. In the asset set having the DAG structure, a node is the object, and an edge represents a relationship between objects in one or more steps of processing of updating states of one or more targets. The added object is a terminal object in the asset for the target specified in the state update request. The second management unit outputs a proof of existence that is the terminal object or a summary thereof. The output proof of existence is saved in an external system managed by a management entity different from a management entity for the node system including the second management unit.

Advantageous Effects of Invention

The proof of existence of the terminal object for each target exists in the external system. Therefore, for a certain target; being tampered with in a way that, for example, a history thereof is recreated or the terminal object is replaced, it is possible to detect that the target is tampered with by using the proof of existence in the external system.

DESCRIPTION OF EMBODIMENTS

Figure 1:
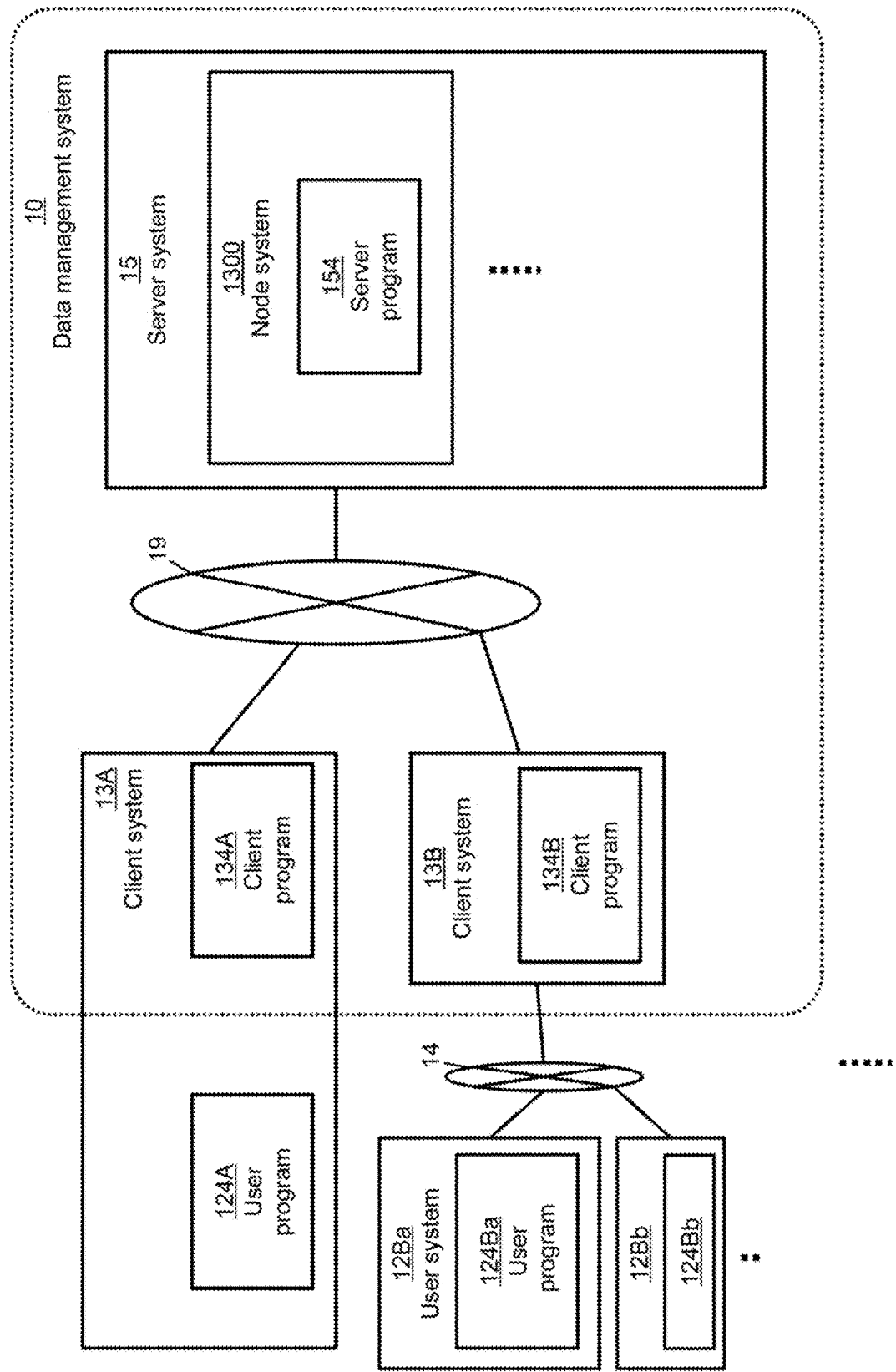
FIG. 1 illustrates an example of the configuration of the entire system according to an embodiment.

In the following description, an "interface apparatus" includes one or more interfaces. The one or more interfaces may include one or more communication interface devices of the same type (e.g., one or more NICs (Network Interface Cards)) or may include two or more communication interface devices of different types (e.g., NIC and HBA (Host Bus Adapter)).

Further, in the following description, a "storage apparatus" includes one or more memories. For the storage apparatus, at least one memory may be a volatile memory. The storage apparatus is mainly used during processing by a processor. In addition to the memories, the storage apparatus may include one or more non-volatile storage devices (e.g., HDD (Hard Disk Drive) or SSD (Solid State Drive)).

Further, in the following description, a "processor" includes one or more processors. At least one of the processors is typically a microprocessor such as a CPU (Central Processing Unit). Each of the one or more processors may be of single-core or multi-core. The processor may include a hardware circuit that performs some or all processing.

Further, in the following description, processing is sometimes described with "program" as the subject, while the subject of the processing may be the processor in view of the fact that the program is executed by the processor to execute specified processing using, for example, a storage apparatus (e.g., memory) and/or an interface apparatus (e.g., a communication port) as appropriate. The processing described with the program as the subject may be processing executed by the processor or an apparatus including the processor. Further, the processor may include a hardware circuit (e.g., FPGA (Field-Programmable Gate Array) or ASIC (Application Specific Integrated Circuit)) that performs some or all processing. The program may be installed from a program source into an apparatus such as a computer. The program source may be, for example, a program distribution server or a computer-readable storage medium (e.g., a non-transitory storage medium). Further, in the following description, two or more programs may be implemented as one program, and one program may be implemented as two or more programs.

Further, in the following description, when the same type of components are described without being distinguished, a common part of reference characters may be used; when the same type of components are distinguished, full reference characters may be used.

Further, the term, "object" as used in the following description refers to a block of logical electronic data in terms of a program such as an application program, and specifically, is data representing a state of a target. Data as an object is, for example, a record, a key-value pair, or a tuple. Hereinafter, a record is taken as an example as an object.

Further, the term "target" as used in the following description refers to any tangible or intangible object. For example, the "target" can refer to an account and a state of the target can refer to a balance.

Further, the term "state update request" as used in the following description refers to a request for state update processing. The term "state update processing" refers to processing for updating the state of the target.

FIG. 1 illustrates an example of the configuration of the entire system according to an embodiment.

A plurality of client systems 13A, 13B, . . . , and a server system 15 are communicably coupled via a communication network 19. A server system 15 includes one or a plurality of node systems 1300. Hereinafter, for the sake of simplicity, it is assumed that the server system 15 is composed of one node system 1300. Note that the plurality of client systems 13A, 13B, . . . are an example of one or more first computer systems. The server system 15 is an example of a second computer system. The node systems 1300 may be managed by different entities, and two or more (e.g., all) node systems 1300 may be managed by a common entity.

The client system 13 executes a client program 134. There may be a client system 13 (e.g., the client system 13A) that executes not only the client program 134 but also a user program 124, or there may be a client system 13 (e.g., the client system 13B) that is coupled via a communication network 14 to a user system 12 that executes a user program 124. The user system 12 may be a user's computer (e.g., a personal computer). The user program 124 may be a Web browser or an application program. The communication network 14 may be integrated with the communication network 19.

A data management system 10 includes a plurality of client programs 134 executed in the plurality of client systems 13A, 13B, . . . , and a server program 154 executed by the node system 1300.

Figure 2:
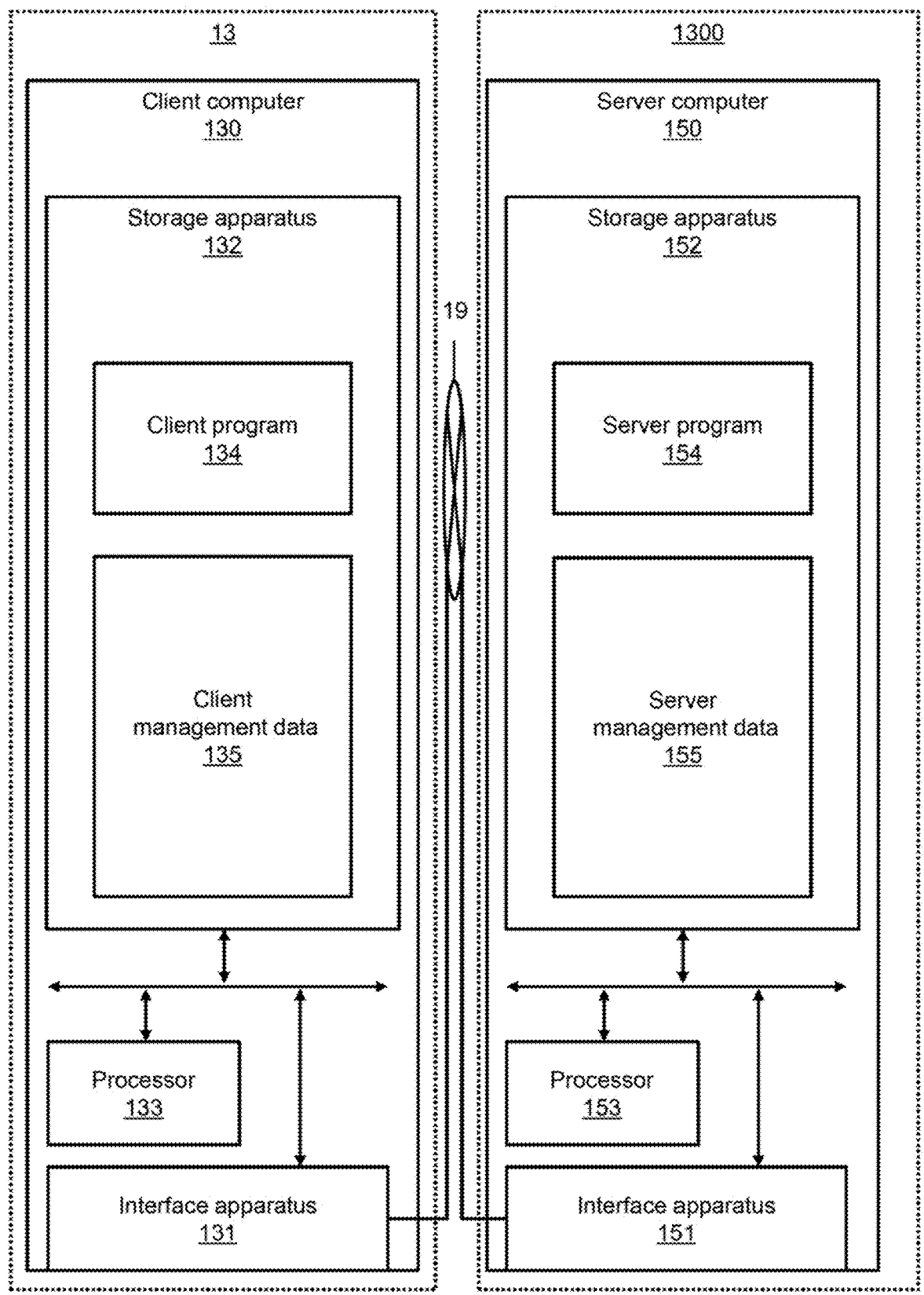
FIG. 2 illustrates an example of the configuration of a client system and a node system according to the embodiment.

FIG. 2 illustrates an example of the configuration of the client system 13 and the node system 1300 according to the present embodiment.

The client system 13 includes one or more client computers 130.

The client computer 130 includes an interface apparatus 131, a storage apparatus 132, and a processor 133 coupled to them.

The interface apparatus 131 is coupled to the communication network 19.

The storage apparatus 132 stores the client program 134 and client management data 135. The client management data 135 is data managed by the client computer 130.

The processor 133 executes the client program 134. The client program 134 is executed by the processor 133 to realize a function as an example of a first management unit. A part of the function may be realized by a hardware circuit such as FPGA or ASIC.

The node system 1300 includes one or more server computers 150 (node computers).

The server computer 150 includes an interface apparatus 151, a storage apparatus 152, and a processor 153 coupled to them.

The interface apparatus 151 is coupled to the communication network 19.

The storage apparatus 152 stores the server program 154 and server management data 155. The server management data 155 is data managed by the server computer 150.

The processor 153 executes the server program 154. The server program. 154 is executed by the processor 153 to realize a function as an example of a second management unit. A part of the function may be realized by a hardware circuit such as FPGA or ASIC.

Figure 3:
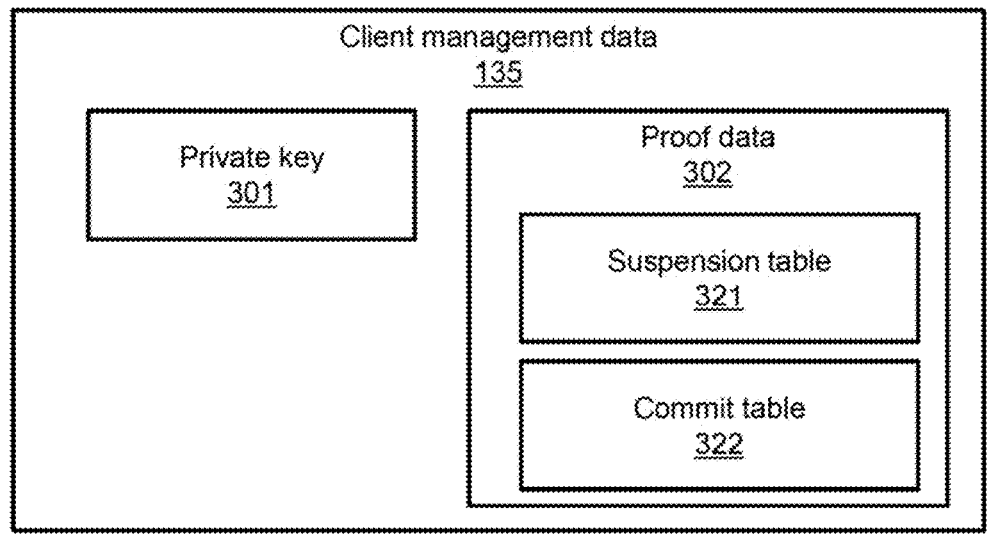
FIG. 3 illustrates an example of client management data.

FIG. 3 illustrates an example of the client management data 135.

The client management data 135 is a private key 301 and proof data 302.

The private key 301 is a user's private key. In a case where the client computer 130 is shared by a plurality of users (e.g., a case where a plurality of user systems 124 are coupled to the client computer 130 via the communication network 14), a private key 301 is stored for each user. Note that the user may be an individual or an organization (e.g., a company or a financial institution).

The proof data 302 is a suspension table 321 and a commit table 322.

The suspension table 321 is an example of data in a first namespace. The suspension table 321 has predetermined types of data (e.g., key and nonce specified in a state update request as will be described later) for state update processing not completed in the server system 15 among information update processing executed in response to an information update request transmitted from the client computer 130.

The commit table 322 is an example of data in a second namespace. The commit table 322 has predetermined types of data (e.g., key, age, HV, and nonce which constitute a proof record described later as will be described later) for state update processing completed in the server system 15 in response to an information update request transmitted from the client computer 130.

Figure 4:
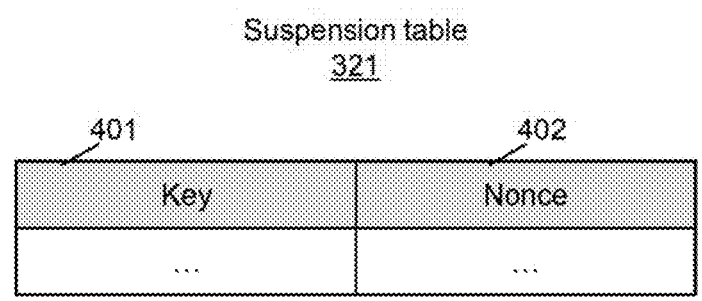
FIG. 4 illustrates an example of a suspension table.

FIG. 4 illustrates an example of the suspension table 321.

The suspension table 321 has a record for each target. The record in the suspension table 321 may be referred to as a "suspension record".

Each suspension record has information such as a key 401 and a nonce 402. Hereinafter, one target, will be taken as an example ("target of interest" in the description of FIG. 4).

The key 401 is the ID of the target of interest. The nonce 402 is an example of a value which is created by the client program 134 and in which cryptographic collision is very difficult (e.g., a random number).

Figure 5:
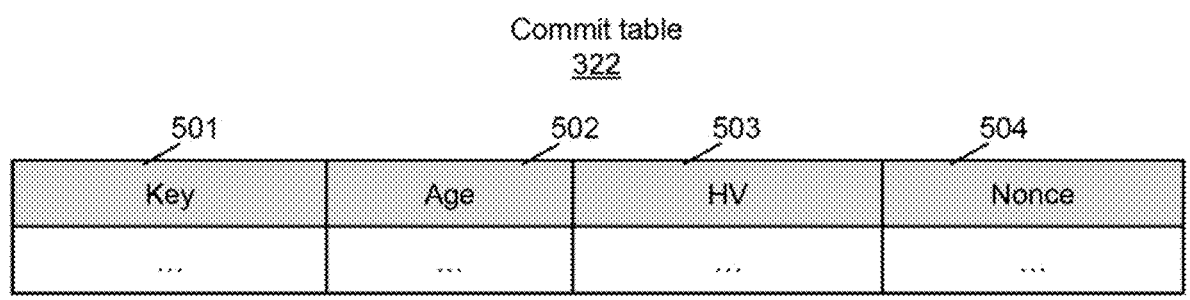
FIG. 5 illustrates an example of a commit table.

FIG. 5 illustrates an example of the commit table 322.

The commit table 322 has a record for each target. Each record in the commit table 322 may be referred to as a "commit record".

For each target, the commit record is an example of proof of existence of the terminal asset record in an asset set 300 (see FIG. 8) described later, and is also a proof record received from the server system 15. The "proof record" is a terminal asset record or its summary. Accordingly, each commit record has all or part of the information that the terminal asset record has. For example, each commit record has information such as a key 501, an age 502, an HV 503, and a nonce 504 as a summary of the terminal asset record (see FIGS. 7 and 8). Hereinafter, one target will be taken as an example ("target of interest" in the description of FIG. 5).

The key 501 is the ID of the target of interest (a key 701 in the terminal asset record). The age 502 represents the latest generation of the target of interest (an age 702 in the terminal asset, record). The hash 503 is a hash value of the terminal asset record for the target of interest (an HV 710 in the terminal asset record). The hash value is an example of a value in which cryptographic collision is difficult. The nonce. 504 is a nonce corresponding to the latest state of the target of interest (a nonce 707 in the terminal asset record).

Figure 6:
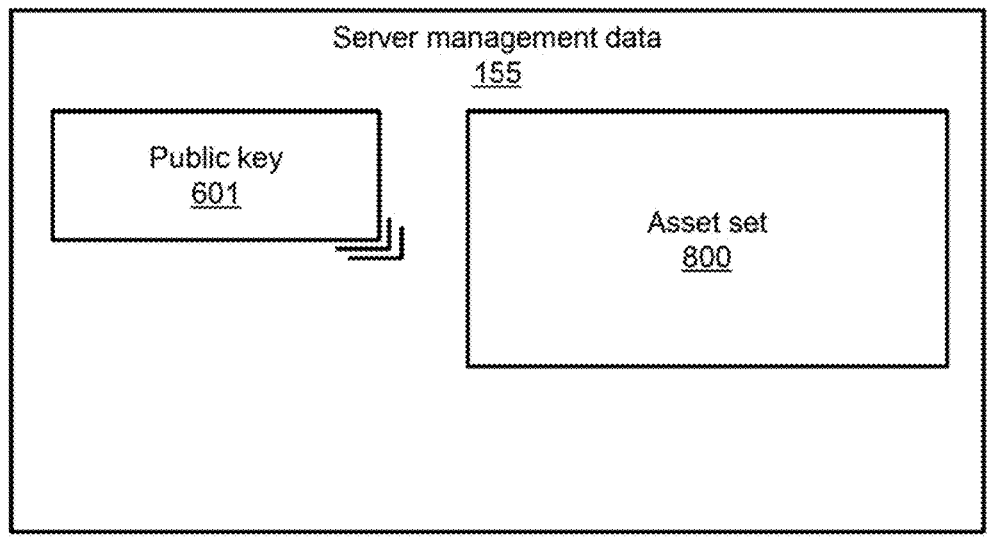
FIG. 6 illustrates an example of server management data.

FIG. 6 illustrates an example of the server management data 155.

The server management data 155 includes a public key 601 and the asset set 800.

The public key 601 is the user's public key. For each user, a public key 601 is acquired.

The asset set 800 is a set of assets.

Figure 7:
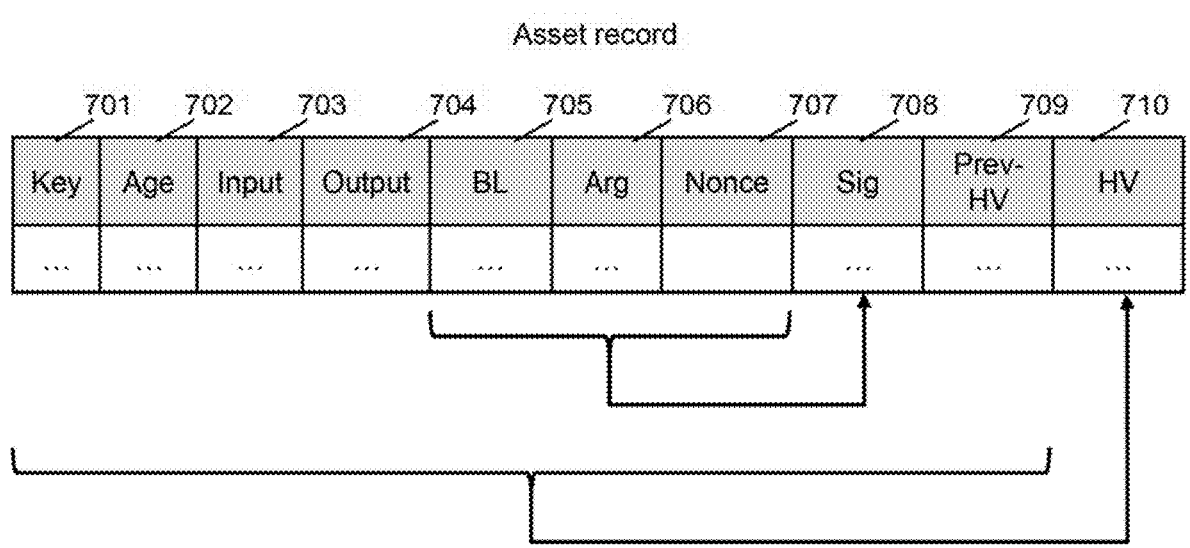
FIG. 7 illustrates an example of an asset table.
Figure 8:
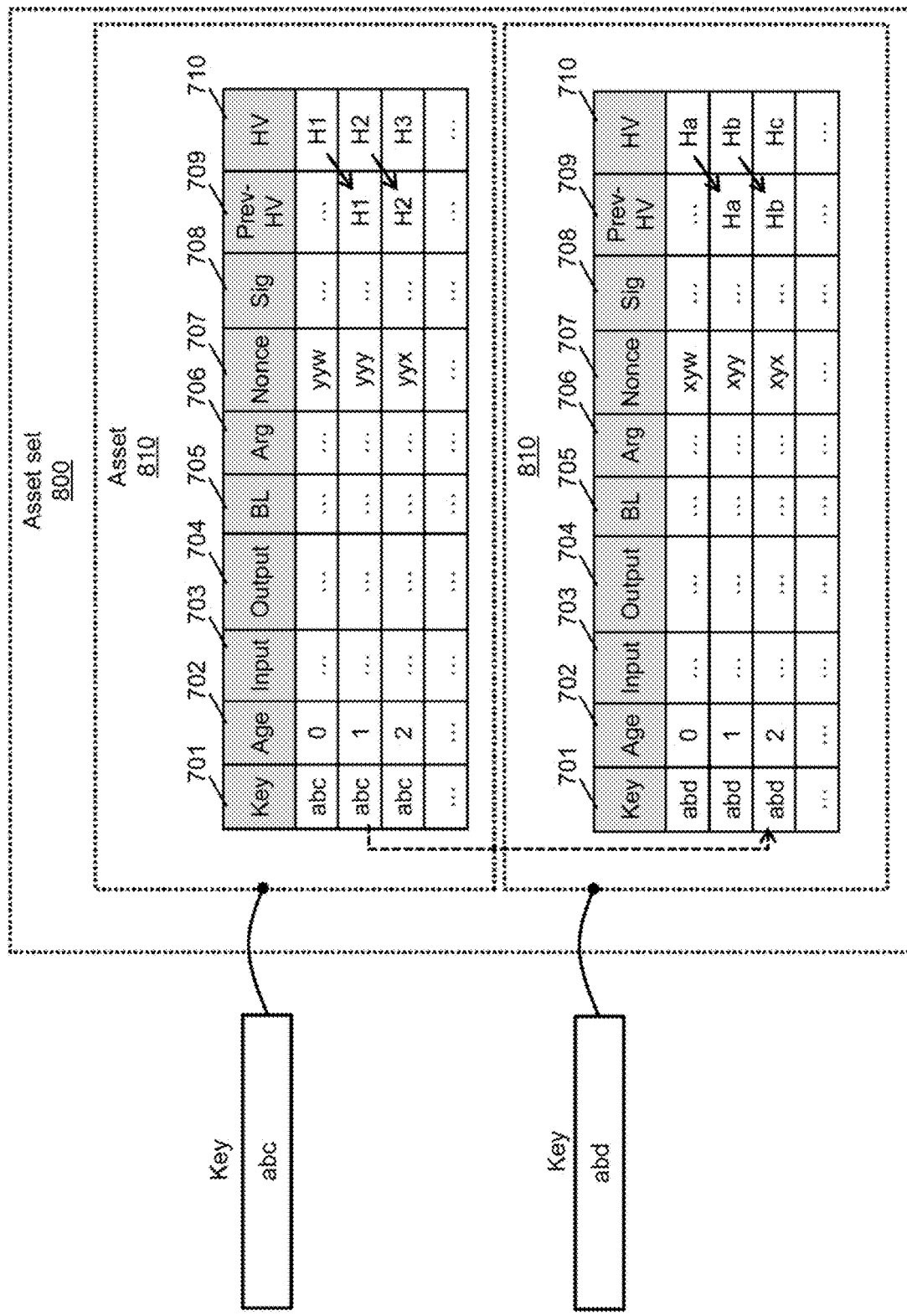
FIG. 8 illustrates an example of the concept of the asset, table.

FIG. 7 illustrates an example of the asset set 300. FIG. 8 illustrates an example of the concept of the asset set 300.

The asset set 800 has an asset 810 for each target. The asset 810 for a target is identified from the key of the target. For each target, the asset 810 may correspond to a ledger.

For each target, the asset 810 is a time series of records. Each record in the asset 310 may be referred to as an "asset record". The asset 810 has at least a terminal asset record. The asset record has information such as the key 701, the age 702, an input 703, an output 704, a BL 705, an Arg 706, the nonce 707, a Sig 708, a Prev-HV 709, and the HV 710. Hereinafter, one target and one asset record will be taken as an example ("target of interest" and "asset record of interest" for the description of FIGS. 7 and 8).

The key 701 is the ID of the target of interest. The Age 702 represents the generation of a state of the target of interest. Each time the state of the target of interest; is updated, a terminal asset record with an incremented age 702 is added.

The input 703 represents the previous state of each of one or more targets including the target of interest. The output 704 represents the latest state of the target of interest. For example, in a case where state update processing in which the asset record of interest is to be added is a transfer from an account of account A (an example of the target of interest) to account B (an example of another target), the Input 703 represents balances of account A and account B immediately before the transfer. The output 704 represents the latest state of account A.

The BL 705 is logic information for identifying a processing logic (e.g., a function) of the state update processing. The logic information is the processing logic itself in the present embodiment, but instead, it may be the ID of the processing logic.

The Arg 706 is argument information which is one or more arguments used in the corresponding processing logic.

The i-th XXX is expressed as $XXX_i$. For example, $output_i$ is expressed as $output_i=BL_i(input_i, Arg_i)$. In other words, $output_i$ is a result of executing $BL_i$ using $input_i$ and $Arg_i$. Note that the input 703 provides a record chain between targets (between assets 810) (see the broken line arrow in FIG. 8).

The nonce 707 is a nonce corresponding to the latest state (output 704) of the target of interest. Specifically, the nonce 707 is a nonce associated with a state update request for state update processing in which the latest state is obtained.

The Sig 700 is an electronic signature using the private key 301 of the user who issued the state update request in which the latest state (output 704) of the target of interest is obtained. The Sig 708 is created on the basis of the BL 705, Arg 706, and nonce 707 in the present embodiment. Note that an electronic signature created on the basis of the BL 705, an electronic signature created on the basis of the Arg 706, and an electronic signature created on the basis of the nonce 707 may be separate.

The Prev-HV 709 has the same value as the UV 710 of the asset record (i.e., the parent asset record) in the pre-state (previous generation) of the target of interest. That is, a link between the HV 710 in the parent asset record and the Prev-HV 709 (see the solid arrows in FIG. 8) provides a record chain in the asset 310 for the target.

The HV 710 is a summary of an asset record of the target of interest, for example, a hash value (hash value in which cryptographic collision is difficult) of at least part of information other than the HV 710 (all information 701 to 709 in the present embodiment).

As described above, in the asset set 300, a record chain is provided between the inputs 703 in the asset records of different assets 810, and a record chain is provided between the Prev-HV 709 and the HV 710 in asset records of the same asset 810. In this way, the asset set 800 has a DAG (Directed Acyclic Graph) structure. In the asset set 800, a node is an asset record and an edge represents a relationship between asset records in one or more state update processing.

Figure 9:
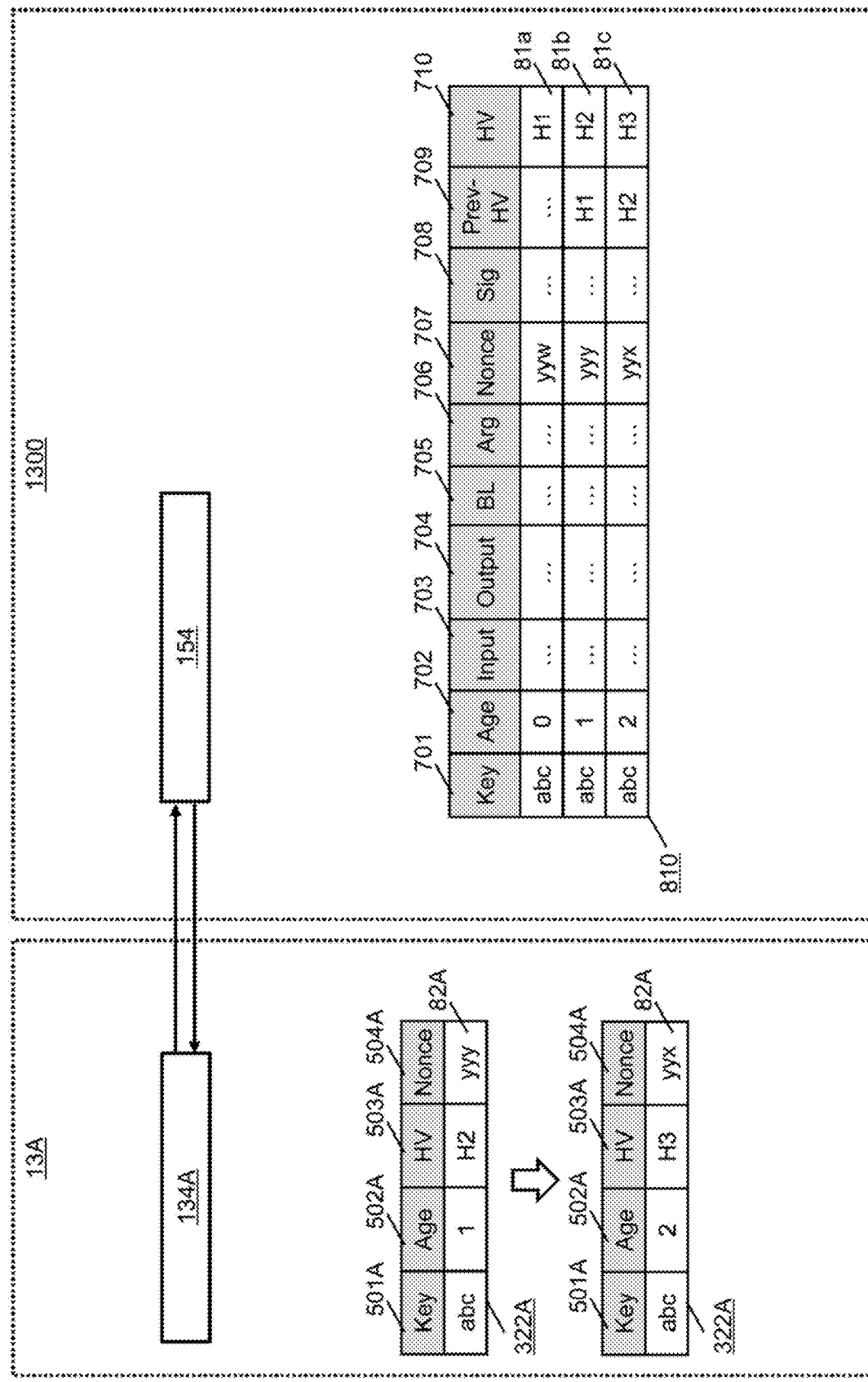
FIG. 9 illustrates an example of the outline of an embodiment.

FIG. 9 illustrates an example of the outline of the present embodiment.

In the outline explanation with reference to FIG. 9, the following assumptions are made.

The client system 13A that manages the key "abc" for user A is taken as an example. In addition, the end of the reference character of each element in the client system 13A is "A".

The asset set 800 has a terminal asset record 81b and a parent asset record 81a thereof for the key "abc". Therefore, a commit record 82A of the client system 13A is a proof of existence of the terminal asset record 81b.

According to FIG. 9, an example of the outline of the present embodiment is as follows.

A client program 134A acquires the commit record 82A including a key 501A that matches the key "abc" from a commit table 322A, creates a state update request associated with the information in the commit record 82A (e.g., a request including the information in the commit record 82A), and transmits the state update request to the server system 15.

The server program 154 of at least one of the node systems 1300 in the server system 15 receives the state update request. The server program 154 compares the HV "H2" in the information associated with the state update request with the HV 710 "H2" in the terminal asset record 81*b* of the asset 810 for the key "abc" in that information. In other words, the server program 154 uses the commit record 82A (proof of existence) to execute tamper-evidence processing of determining whether or not the terminal asset record 81*b* is tampered with.

If the result of the tamper-evidence processing indicates that it is not tampered with, the server program 154 executes the state update processing in response to the state update request. The server program 154 adds an asset record 81*c* in which the age 702 is incremented to "2" in the execution of the state update processing. As a result, the asset record 81*c* becomes the latest terminal asset record, and the asset record 81*b* having the age 702 "1" becomes the parent asset record of the latest terminal asset record 81*c*.

The server program 154 transmits a proof record (i.e., a record composed of key "abc", age "2", HV "H3", and nonce "yyx"), which is the proof of existence of the terminal asset record 81*c*, to the client program 134A.

The client program 134A overwrites the commit record 82A with the proof record received from the server program 154. The proof record may be added to the commit table 322A as a new commit record 82A.

The details of processing executed in the present embodiment will be described below with reference to FIG. 10.

Figure 10:
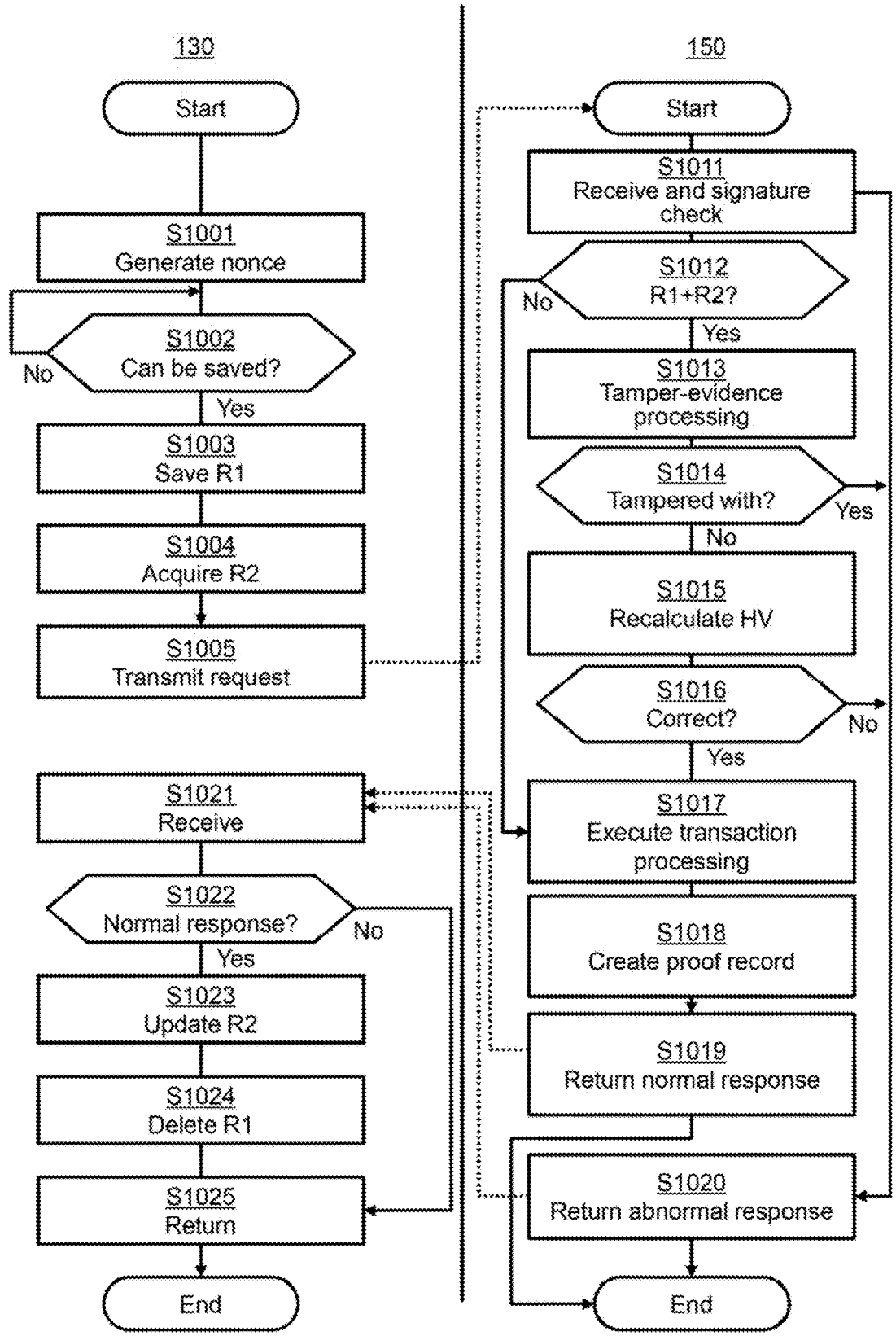
FIG. 10 is a flowchart of processing executed in the embodiment.

FIG. 10 is a flowchart of processing executed in the present embodiment.

For example, when the client program 134 receives the state update request from the user program 124, the processing flow illustrated in FIG. 10 is started.

In S1001, the client program 134 creates a nonce.

In S1002, the client program 134 determines whether or not the target key specified in the state update request ("key of interest" in the description of FIG. 10) and the nonce created in S1001 can be saved in the suspension table 321. If there is not a suspension record including the key 401 that matches the key of interest, the determination result in S1002 is true (S1002: Yes); if there is the suspension record, the determination result in S1002 is false (S1002: No). S1002: For "No", it waits for the suspension record to be deleted.

S1002: For "Yes", in S1003, the client program 134 saves the suspension record including the key of interest and the nonce created in S1001 in the suspension table 321. The suspension record saved in S1003 is referred to as "R1" in the description of FIG. 10.

In S1004, if there is a commit record including the key 701 that matches the key of interest, the client program 134 acquires the commit record from the commit table 322. The commit record acquired in S1004 is referred to as "R2" in the description of FIG. 10.

In S1005, the client program 134 creates a state update request and transmits the created state update request to the server system 15. The following (a) to (d) are associated with the transmitted state update request.
  (a) R1 or R1 and R2 (R2 is a commit record that exists in the case of the second and subsequent updates of the key of interest)
  (b) BL and Arg related to the state update processing
  (c) nonce created in S1001
  (d) Sig created using the private key of the user who issued the state update request for (b) and (c)

In S1011, the server program 154 receives the state update request transmitted in S1005. The server program 154 verifies the correctness of the Sig associated with the state update request by using the public key of the user corresponding to that request. As a result, if the Sig is incorrect, in S1020, the server program 154 returns an abnormal response (error) indicating that the state update request may be tampered with to the client program 134.

In S1012, the server program 154 determines whether or not both H1 and R2 are associated with the state update request received in S1011. If the determination result in S1012 is false (S1012: No), S1017 is executed.

If the determination result in S1012 is true (S1012: Yes), in S1013, the server program 154 executes tamper-evidence processing, specifically, the following (x) and (y).
  (x) The server program 154 determines whether or not the asset record including the key 701 that matches the key in R1 includes the nonce 707 that matches the nonce in R1. This determination result of true means that the asset record may be tampered with. The determination of (x) may be made for all asset records including the key 701 that matches the key in R1.
  (y) The server program 154 determines whether or not the terminal asset record including the key 701 that matches the key in R2 includes the HV 710 and nonce 707 that matches the HV and nonce in R2. This determination result of false means that the terminal asset record may be tampered with.

In S1014, the server program 154 determines whether or not it may be tampered with in S1013. If the determination result in S1014 is true (S1014: Yes), in S1020, the server program 154 returns an abnormal response indicating that the asset 310 for the key of interest may be tampered with to the client program 134. The abnormal response may include an asset record or its summary that may be tampered with.

If the determination result in S1014 is false (S1014: No), in S1015, the server program 154 recalculates a hash value of the terminal asset record including the key 701 that matches the key in R2.

In S1016, the server program 154 determines whether or not the hash value calculated in S1015 matches the HV 710 in the terminal asset record (i.e., whether or not the HV 710 is correct). If the determination result in S1016 is false (S1016: No), in S1020, the server program 154 returns an abnormal response indicating that the asset 810 for the key of interest may be tampered with to the client program 134. The abnormal response may include a terminal asset record or its summary that may be tampered with.

If the determination result in S1016 is true (S1016: Yes), in S1017, the server program 154 executes the state update processing in accordance with the request received in S1011. In the execution of this state update processing, a new asset record is added to the asset set 800 for the key of interest. In S1018, the server program 154 creates a proof record (a record composed of key, age, HV, and nonce in the terminal asset record) of the new terminal asset record added in S1017. In S1019, the server program 154 returns a completion response associated with the proof record created in S1018 to the client program 134 in response to the state update request received in S1011.

In S1021, the client program 134 receives either the abnormal response or a normal response associated with the proof record.

In S1022, the client program 134 determines whether or not the response received in S1021 is the normal response. If the determination result in S1022 is false (S1022: No), in S1025, the client program 134 returns an abnormal response (e.g., notification that it may be tampered with) to the user program 124.

If the determination result in S1022 is true (S1022: Yes), in S1023, the client program 134 overwrites the commit record for the key of interest with the proof record associated with the normal response. In S1024, the client program 134 deletes the suspension record for the key of interest. In S1025, the client program 134 returns a normal response to the user program 124.

The above is the details of the processing executed in the present embodiment. Note that, for example, at least one of the following may be adopted.

- S1002 and S1003 may be skipped (may be optional processing). As a result, R1 may be not necessary.
- The tamper-evidence processing using R1 and R2 (R2 in a case where S1003 is skipped) may be executed (asynchronously) separately from the state update processing executed in response to the state update request.
- S1015 and S1016 may be skipped (may be optional processing).
- The user's private key may not be necessary, and the data structure of the asset set 800 may be another data structure as long as it is a subset of the DAG structure (e.g., it may be a tree structure). This is because neither the user's private key nor the above-mentioned data structure of the asset set 800 is essential for the creation and storage of a proof of existence of the terminal asset record. Therefore, an electronic signature may not be used for the authentication in S1011.

In the present embodiment, for example, the following effects are expected.

For each target, a partial tampered asset record other than the terminal asset record can be detected by the server program 154 checking the HV (hash value) from the first asset record (by following the hash chain). However, it is difficult to detect a tampered (e.g., updated or deleted) terminal asset record only by the server program 154. Therefore, under the premise that it is extremely difficult to maliciously and consistently rewrite data in a plurality of systems managed by different management entities (e.g., individuals, organizations, or computers), it is possible to detect a tampered terminal asset record, in which a terminal asset record is tampered with, by saving, for each target, a proof of existence of the terminal asset record in an external system managed by a management entity different from the management entity for the node system 1300 (e.g., another node system 1300 or a system outside the server system 15), and by executing tamper-evidence processing of determining whether or not the terminal asset record is tampered with by using the proof of existence.

Further, for each target, the proof of existence saved in the external system is the proof of existence of the terminal asset record of the asset 810 in the server system 15, which is a small amount of data as compared with the entire asset 810. As a result, the storage capacity to be consumed in the external system can be reduced.

Further, for each target, the proof of existence of the terminal asset record may be the terminal, asset record itself, but in the present embodiment, is a smaller amount of data including the HV (hash value) of the terminal asset record. As a result, the storage capacity to be consumed in the external system can be reduced as compared with the storage capacity to be consumed in the case where the terminal asset record itself is stored.

Further, for each target, the external system in which the proof of existence of the terminal asset record is saved may be any system other than the node system 1300 that manages the terminal asset record, but in the present embodiment, is the client system 13 that has issued the state update request for the state update processing in which the terminal asset record is added for the target. In other words, the client system 13 itself that, has issued the state update request manages the proof of existence of the asset record added in response to the state update request. Accordingly, the proof of existence is less likely to be tampered with than the case where the proof of existence is managed by a system managed by a management entity other than the management entity for the client system 13.

Further, for each target, since the commit record has a nonce created by the client, program 134, it is difficult for the server system 15 side to deny the existence of the terminal asset record of that target.

Further, in the present embodiment, an electronic signature using the user's private key is given to the processing logic. In other words, the processing logic can be defined by the user who has a valid private key. The output and hash value can be recalculated using such a processing logic with an electronic signature. As a result, tamper-evidence is improved.

Further, the suspension table 321 is useful for checking the consistency between the client system 13 and the server system 15 and for recovery and detection of whether or not it is tampered with based on the result; of the check. For example, the following is possible.

- For a request related to a certain target, in a case where there is a record in the suspension table 321 but no record in the asset set 300, it can be inferred that a request has been issued by the client system 13, but the state update processing in accordance with that request may not be executed in the server system 15, or the state update processing has been executed in the server system 15 but the asset record may have been deleted. Therefore, in this case, the client program 134 retransmits the request or executes the tamper-evidence processing.
- For a request related to a certain target, in a case where there is a record in the suspension table 321 and also a record in the asset set 300 but no record in the commit table 322, it can be inferred that a request has been issued by the client system 13 and the state update processing in accordance with that request has been executed in the server system 15, but a proof record is not arrived at the client system 13. Therefore, in this case, the client program 134 transmits a proof record acquisition request in which the key of interest is specified (a request for acquiring a proof record for the key of interest) to the server system 15 to acquire the proof record from the server system 15.

The above is the description of the present embodiment. The present embodiment may be an embodiment in which a partial Byzantine fault (e.g., the server program 154 of the server program 154 and the asset set 800 cannot be tampered with, but the asset set 800 can be tampered with) is assumed. On the client side, the hash value of the DAG terminal asset record may be saved as an example of proof of existence. In the present, embodiment, for example, at least one of the following may be adopted.

- The save location of the proof of existence of the terminal asset record is not limited to the client system 13 and may be any system other than the node system 1300 having that terminal asset record (or the server system 15 including the node system 1300) as long as it is a system managed by a management entity different from the management entity for the node system 1300 having that terminal asset record.
- The processing logic may be a logic obtained by the user from an external site or the server system 15.

There may be a plurality of server computers 150 constituting the server system 15. In that case, a server system having any architecture (e.g., a master/slave type system) may be adopted, and a decentralized system may be adopted as the server system.

The server system 15 may include a plurality of node systems in which each node system is composed of one or more server computers 150. In this case, a proof record created in a certain node system may be saved in another node system managed by a management entity different from the management entity for the certain node system instead of the client system 13.

Further, in the present embodiment, the entire system including the client system 13 and the server system 15 can be largely divided into the server side where the server system 15 is deployed and the client side where other than the server side of the entire system is deployed. The proof of existence of the terminal asset record may be saved on the client side. As saving the proof of existence on the client side, for example, there are the following first and second save examples.

Figure 11A:
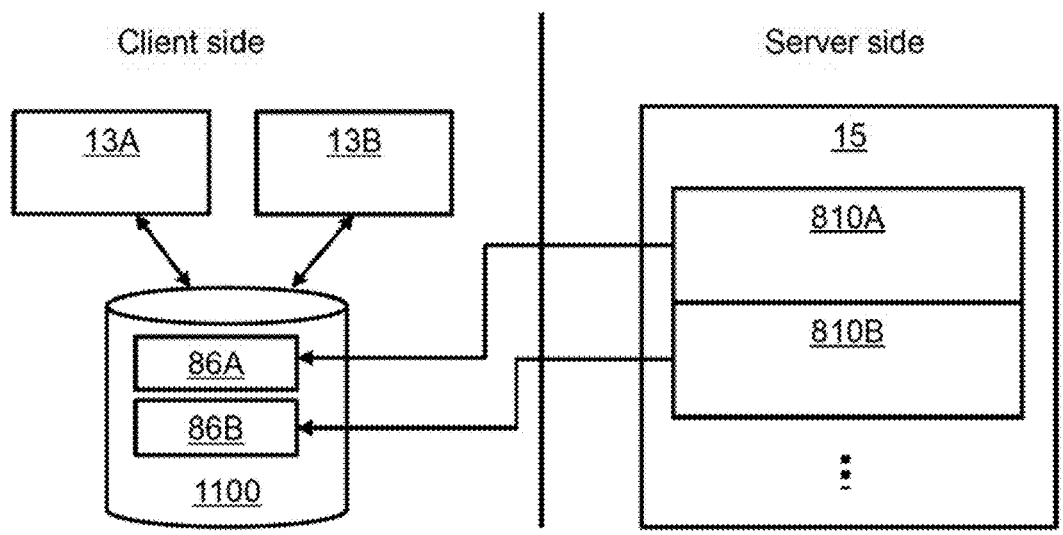
FIG. 11A illustrates a first save example of a proof of existence.

> FIG. 11A illustrates a first save example. According to the first save example, the proof of existence of the terminal asset record for each target is stored in a shared storage apparatus 1100 that can be accessed by a plurality of client systems 13 (or a plurality of client computers 130 in the same client system 13). For example, in a case where a request of user A is transmitted from the client system 13A; in response to the request, funds are transferred from account A of user A (an example of target A) to account B of user B (an example of target B); as a result, a terminal asset record (an asset record indicating a balance after withdrawal from account A) is added to the asset 810A for account A; and a terminal asset record (an asset record indicating a balance after deposit to account S) is also added to the asset 810B for account B, a proof of existence 86A of the terminal asset record added to the asset 810A for account A as well as a proof of existence 86B of the terminal asset record added to the asset 810B for account B may be stored in the above-mentioned shared storage apparatus. According to the first save example, the asset record managed by each client system 13 does not have to be disjoint.

Figure 11B:
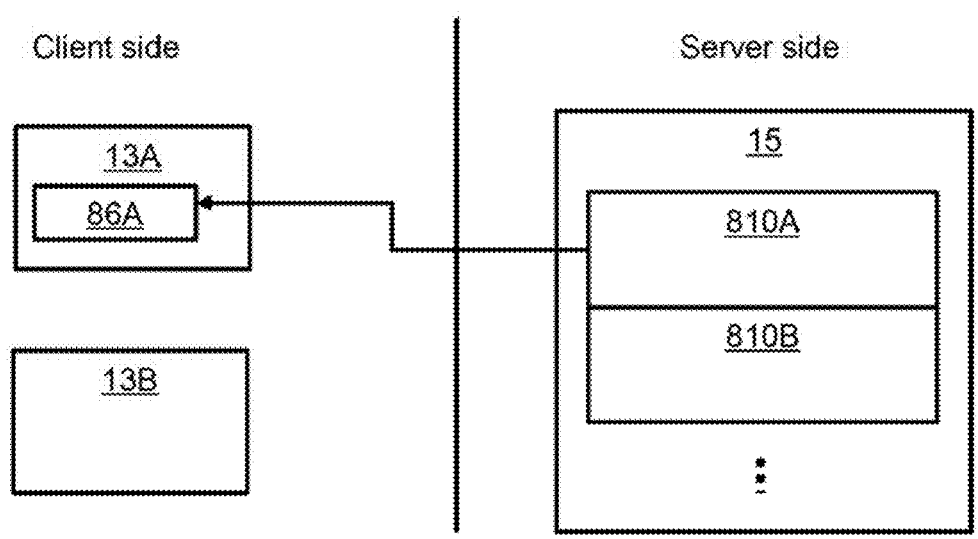
FIG. 11B illustrates a second save example of a proof of existence.

> FIG. 11B illustrates a second save example. The second save example is applied only to the case where the asset record managed by each client system 13 is disjoint. Thus, according to the second save example, for example, a state update request in which target A is specified is transmitted from the client system 13A, a terminal asset record is added to the asset 810A for target A in response to that state update request, and the proof of existence 86A of the added terminal asset record is stored in the client system 13A. The proof of existence 86A is not stored in any client system other than the client system 13A.

While one embodiment has been described above, such an embodiment is an example for describing the present invention and is not intended to limit the scope of the present invention to the embodiment. The present invention can be implemented even in various other forms.

For example, the asset set may be a plurality of transactions having a DAG structure such as UTXO (Unspent Transaction Output) (each transaction includes one or more inputs and one or more outputs). In other words, an object to be a node may be a transaction, and a relationship represented by an edge may be a relationship between transactions.

Figure 12:
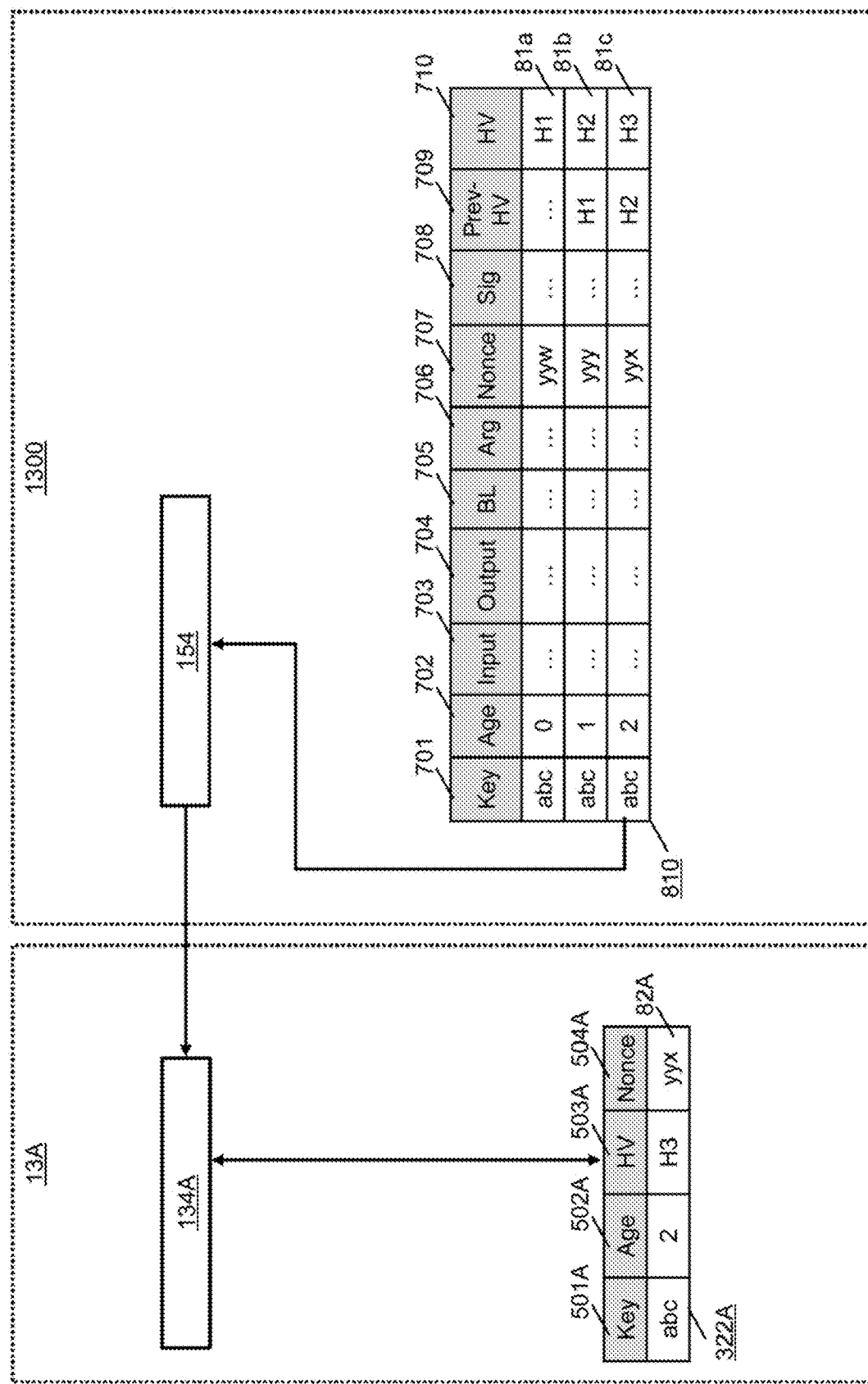
FIG. 12 illustrates an example of executing tamper-evidence processing on a client system.

Further, for example, the tamper-evidence processing of determining whether or not a terminal asset record is tampered with may be executed by a certain system other than the node system 1300 having the server program 154. The "certain system" may be another node system 1300, the client system 13, or another system. Specifically, for example, after the state update processing illustrated in FIG. 9 is executed and the proof record of the latest terminal asset record 81c is received by the client program 134A and then saved as the commit record 82A, the client program 134A may receive the terminal asset record 81c or its summary from the node system 1300, and use the terminal asset record 81c or its summary and the saved commit record 82A (proof of existence) to execute the tamper-evidence processing of determining whether or not the asset record 81c is tampered with, as illustrated in FIG. 12. The trigger for the client program 134A to receive the terminal asset record 81c or its summary from the node system 1300 may be any of the following.

> The client program 134A has transmitted a state read request to the node system 1300. The state read request is a request to refer to a state. At least the key "abc" in the commit record 82A is associated with the state read request. When receiving the state read request, the server program 154 acquires the terminal asset record 81c of the asset 810 for the key "abc" associated with the state read request, and returns a response indicative of the terminal asset record 81c or its summary to the client program 134A. As a result, the client program 134A receives the terminal asset record 81c or its summary from the node system 1300.

> The client program 134A has transmitted, to the node system 1300, a state update request for the state update processing in which a terminal asset record is added to the asset 810 for the key "abc" after the state update processing in which the terminal asset record 81c is added. At least the key "abc" in the commit record 82A is associated with the state update request. When receiving the state update request, the server program 154 acquires the terminal asset record 81c of the asset 810 for the key "abc" associated with the state update request, and returns a response indicative of the terminal asset record 81c or its summary to the client program 134A. As a result, the client program 134A receives the terminal asset record 81c or its summary from the node system 1300. Note that, in this case, the server system 150 does not have to execute the tamper-evidence processing (e.g., S1013 in FIG. 10) in the state update processing executed in response to the state update request.

In addition to one or more node systems 1300, the server system 15 may include a relay system that relays communication between the server system 15 and the node system 1300. The relay system may transfer a request from the client system 13 to the node system 1300, or may transfer a proof record from the node system 1300 to the client system 13.

REFERENCE SIGNS LIST

13 Client system
15 Server system

The invention claimed is:

1. A data management system, comprising:
   at least one first management unit included in one or a plurality of client computer systems; and
   at least one second management unit managing an asset set included in one or a plurality of node systems in a server computer system that communicates with the one or a plurality of client computer systems, wherein
   the asset set is a set of assets,
   the asset set has a DAG (Directed Acyclic Graph) structure,
   the assets correspond one-to-one with targets,
   the asset is a hash chain of objects,
   the object is data that represents a state of the target,
   in the asset set having the DAG structure, a node is the object, and an edge represents a relationship between objects in one or more steps of processing of updating states of one or more objects,
   a management entity for any client computer system is different from a management entity for any node system in the server computer system,
   every time any of the first management unit issues a state update request, in which a target is specified, to the server computer system,
   if a proof of existence, which is a terminal object of the asset corresponding to the specified target among the asset set, or, which is a summary of the terminal object, is stored in the client computer system including the first management unit, the first management unit associates the proof of existence with the state update request which is issued to the server computer system,
   the second management unit which has received the state update request having the proof of existence:
      uses proof of existence which is associated with the received state update request to determine whether the terminal object of the asset corresponding to the target specified in the received state update request is tampered with,
      adds an object representing the updated state of the target specified in the received status update request to an end of the asset corresponding to the target specified in the received state update request, when determining that the terminal object is not tampered with,
      the added object is a terminal object in the asset for the target specified in the state update request, and
      outputs a proof of existence that is the terminally added object or a summary thereof to the client computer system including the first management unit which sent the state update request, and
      the first management unit in the client computer system received the output proof of existence overwrites the received proof of existence with the proof of existence stored in the client computer system,
   for each target:
      if there is a tampered object other than the terminal object, the second management unit is configured to detect the tampered object by following the hash chain from the first object of the asset; and
      if there is a tampered terminal object, the first management unit or the second management unit is configured to detect the tampered terminal object by comparing the terminal object stored in the server computer system having the second management unit with the proof of existence stored in the client computer system having the first management unit.

2. The data management system according to claim 1, wherein
   the first management unit
      receives the proof of existence from the server computer system and saves the proof of existence, and then receives the terminal object or the summary thereof from the server computer system, and
      uses the terminal object or the summary thereof and the saved proof of existence to determine whether the terminal object is tampered with.

3. The data management system according to claim 2, wherein the first management unit
   issues a state read request, in which the target is specified, to the server computer system, and
   in response to the state read request, receives a terminal object of the asset for the target or a summary thereof from the server computer system.

4. The data management system according to claim 1, wherein
   the state update request is associated with a value which is created by the first management unit and in which cryptographic collision is difficult, and
   each of the terminal object and the proof of existence of the terminal object include the value.

5. The data management system according claim 1, wherein the state update request is associated with
   an ID for identifying processing or processing information that is the processing itself, and
   argument information that is one or more arguments used for the processing, the added object includes
   pre-processing state information indicating a state of the specified target before being subjected to processing,
   post-processing state information indicating a state of the specified target after being subjected to processing,
   the processing information associated with the state update request, and
   the argument information associated with the state update request.

6. The data management system according to claim 1, wherein the data management system lacks a competition including proof of work or proof of stake.

7. A data management method, comprising:
   issuing, by a first computer system of one or a plurality of client computer systems of at least one first management unit, a state update request in which a target is specified to a server computer system that communicates with the one or a plurality of first computer systems;
   receiving, by a node systems of one or more node systems in the server computer system of at least one second management unit, the state update request and executing, by the node system, processing of updating a state of the target specified in the state update request; and
   adding, by the node system, an object to an asset for the target in an asset set managed by the node system in the executing, wherein
   the asset set is a set of assets,
   the asset set has a DAG (Directed Acyclic Graph) structure,
   the assets correspond one-to-one with targets,
   the asset is a hash chain of objects,
   the object is data that represents a state of the target,
   in the asset set having the DAG structure, a node is the object, and an edge represents a relationship between objects in one or more steps of processing of updating states of one or more objects, a management entity for any client computer system is different from a management entity for any node system in the server computer system, every time any of the first management unit issues a state update request, in which a target is specified, to the server computer system, if a proof of existence, which is a terminal object of the asset corresponding to the specified target among the asset set, or, which is a summary of the terminal object, is stored in the client computer system including the first management unit, the first management unit associates the proof of existence with the state update request which is issued to the server computer system, the second management unit which has received the state update request having the proof of existence:

uses proof of existence which is associated with the received state update request to determine whether the terminal object of the asset corresponding to the target specified in the received state update request is tampered with, adds an object representing the updated state of the target specified in the received status update request to an end of the asset corresponding to the target specified in the received state update request, when determining that the terminal object is not tampered with, the added object is a terminal object in the asset for the target specified in the state update request, and outputs a proof of existence that is the terminally added object or a summary thereof to the client computer system including the first management unit which sent the state update request, and the first management unit in the client computer system received the output proof of existence overwrites the received proof of existence with the proof of existence stored in the client computer system, for each target:

if there is a tampered object other than the terminal object, the second management unit is configured to detect the tampered object by following the hash chain from the first object of the asset; and if there is a tampered terminal object, the first management unit or the second management unit is configured to detect the tampered terminal object by comparing the terminal object stored in the server computer system having the second management unit with the proof of existence stored in the client computer system having the first management unit.

8. A data management method, comprising:

receiving, by a node system of one or a plurality of node systems in a server computer of at least one second management unit that communicates with one or a plurality of client computer systems of at least one first management unit, a state update request in which a target is specified;

executing, by the node system, processing of updating a state of the target specified in the state update request;

adding, by the node system, an object to an asset for the target in an asset set managed by the node system in the executing, wherein the asset set is a set of assets, the asset set has a DAG (Directed Acyclic Graph) structure, the assets correspond one-to-one with targets, the asset is a hash chain of objects, the object is data that represents a state of the target, in the asset set having the DAG structure, a node is the object, and an edge represents a relationship between objects in one or more steps of processing of updating states of one or more objects, a management entity for any client computer system is different from a management entity for any node system in the server computer system, every time any of the first management unit issues a state update request, in which a target is specified, to the server computer system, if a proof of existence, which is a terminal object of the asset corresponding to the specified target among the asset set, or, which is a summary of the terminal object, is stored in the client computer system including the first management unit, the first management unit associates the proof of existence with the state update request which is issued to the server computer system, the second management unit which has received the state update request having the proof of existence:

uses proof of existence which is associated with the received state update request to determine whether the terminal object of the asset corresponding to the target specified in the received state update request is tampered with, adds an object representing the updated state of the target specified in the received status update request to an end of the asset corresponding to the target specified in the received state update request, when determining that the terminal object is not tampered with, the added object is a terminal object in the asset for the target specified in the state update request, and outputs a proof of existence that is the terminally added object or a summary thereof to the client computer system including the first management unit which sent the state update request, and the first management unit in the client computer system received the output proof of existence overwrites the received proof of existence with the proof of existence stored in the client computer system, for each target:

if there is a tampered object other than the terminal object, the second management unit is configured to detect the tampered object by following the hash chain from the first object of the asset; and if there is a tampered terminal object, the first management unit or the second management unit is configured to detect the tampered terminal object by comparing the terminal object stored in the server computer system having the second management unit with the proof of existence stored in the client computer system having the first management unit.

9. The data management method according to claim 7, further comprising:

receiving, by the client computer system, the proof of existence from the server computer system and saving, by the client computer system, the proof of existence, and then receiving, by the client computer system, the terminal object or the summary thereof from the server computer system, and using, by the client computer system, the terminal object or the summary thereof and the saved proof of existence to determine whether the terminal object is tampered with.

10. A non-transitory computer readable medium, storing instructions that are executed by one or more processors for causing a node system of one or a plurality of node systems in a server computer system of at least one second management unit that communicates with one or more client computer systems of at least one first management unit to:
receive a state update request in which a target is specified;
execute processing of updating a state of the target specified in the state update request; add an object to an asset for the target in an asset set managed by the node system in the executing,
the asset set is a set of assets,
the asset set has a DAG (Directed Acyclic Graph) structure,
the assets correspond one-to-one with targets,
the asset is a hash chain of objects,
the object is data that represents a state of the target,
in the asset set having the DAG structure, a node is the object, and an edge represents a relationship between objects in one or more steps of processing of updating states of one or more objects,
a management entity for any client computer system is different from a management entity for any node system in the server computer system,
every time any of the first management units issue a state update request, in which a target is specified, to the server computer system,
if a proof of existence, which is a terminal object of the asset corresponding to the specified target among the asset set, or, which is a summary of the terminal object, is stored in the client computer system including the first management unit, the first management unit associates the proof of existence with the state update request which is issued to the server computer system,
the second management unit which has received the state update request having the proof of existence:
uses proof of existence which is associated with the received state update request to determine whether the terminal object of the asset corresponding to the target specified in the received state update request is tampered with,
adds an object representing the updated state of the target specified in the received status update request to an end of the asset corresponding to the target specified in the received state update request, when determining that the terminal object is not tampered with,
the added object is a terminal object in the asset for the target specified in the state update request, and
outputs a proof of existence that is the terminally added object or a summary thereof to the client computer system including the first management unit which sent the state update request, and
the first management unit in the client computer system received the output proof of existence overwrites the received proof of existence with the proof of existence stored in the client computer system,
for each target:
if there is a tampered object other than the terminal object, the second management unit is configured to detect the tampered object by following the hash chain from the first object of the asset; and
if there is a tampered terminal object, the first management unit or the second management unit is configured to detect the tampered terminal object by comparing the terminal object stored in the server computer system having the second management unit with the proof of existence stored in the client computer system having the first management unit.

11. A non-transitory computer readable medium, storing instructions that are executed by one or more processors for causing a client computer system of at least one second management unit of one or a plurality of first computer systems that communicate with a server computer system of at least one first management unit including one or a plurality of node systems to:
issue a state update request, in which a target is specified, to the second computer system;
a node system of the one or more node systems being configured to receive the state update request and execute, by the node system, processing of updating a state of the target specified in the state update request;
the node system being configured to add an object to an asset for the target in an asset set managed by the node system
the asset set is a set of assets,
the asset set has a DAG (Directed Acyclic Graph) structure,
the assets correspond one-to-one with targets,
the asset is a hash chain of objects,
the object is data that represents a state of the target,
in the asset set having the DAG structure, a node is the object, and an edge represents a relationship between objects in one or more steps of processing of updating states of one or more objects,
a management entity for any client computer system is different from a management entity for any node system in the server computer system,
every time any of the first management unit issues a state update request, in which a target is specified, to the server computer system,
if a proof of existence, which is a terminal object of the asset corresponding to the specified target among the asset set, or, which is a summary of the terminal object, is stored in the client computer system including the first management unit, the first management unit associates the proof of existence with the state update request which is issued to the server computer system,
the second management unit which has received the state update request having the proof of existence:
uses proof of existence which is associated with the received state update request to determine whether the terminal object of the asset corresponding to the target specified in the received state update request is tampered with,
adds an object representing the updated state of the target specified in the received status update request to an end of the asset corresponding to the target specified in the received state update request, when determining that the terminal object is not tampered with, the added object is a terminal object in the asset for the target specified in the state update request, and outputs a proof of existence that is the terminally added object or a summary thereof to the client computer system including the first management unit which sent the state update request, and the first management unit in the client computer system received the output proof of existence overwrites the received proof of existence with the proof of existence stored in the client computer system, for each target:

if there is a tampered object other than the terminal object, the second management unit is configured to detect the tampered object by following the hash chain from the first object of the asset; and if there is a tampered terminal object, the first management unit or the second management unit is configured to detect the tampered terminal object by comparing the terminal object stored in the server computer system having the second management unit with the proof of existence stored in the client computer system having the first management unit.

* * * * *